United States Patent
Mahmoud et al.

(10) Patent No.: US 11,483,273 B2
(45) Date of Patent: Oct. 25, 2022

(54) CHAT-BASED INTERACTION WITH AN IN-MEETING VIRTUAL ASSISTANT

(71) Applicant: Cisco Technology, Inc., San Jose, CA (US)

(72) Inventors: Mohamed Gamal Mohamed Mahmoud, Santa Clara, CA (US); Omar Tarek El-Sadany, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 96 days.

(21) Appl. No.: 16/928,706

(22) Filed: Jul. 14, 2020

(65) Prior Publication Data

US 2021/0021558 A1    Jan. 21, 2021

Related U.S. Application Data (60) Provisional application No. 62/874,479, filed on Jul. 15, 2019.

(51) Int. Cl.
| | | |
|---|---|---|
| *G06F 40/10* | (2020.01) | |
| *G06F 40/20* | (2020.01) | |
| *G06F 40/40* | (2020.01) | |
| *G06F 40/166* | (2020.01) | |
| *H04L 51/42* | (2022.01) | |
| *G06F 40/289* | (2020.01) | |
| *G10L 15/22* | (2006.01) | |

(52) U.S. Cl.
CPC ............ *H04L 51/42* (2022.05); *G06F 40/289* (2020.01); *G10L 15/22* (2013.01)

(58) Field of Classification Search
USPC .................................... 704/1–278; 706/5–21
See application file for complete search history.

(56) References Cited

U.S. PATENT DOCUMENTS

| | | | |
|---|---|---|---|
| 2016/0019893 A1* | 1/2016 | Funase | G10L 15/22 704/235 |
| 2017/0132019 A1* | 5/2017 | Karashchuk | G06F 40/166 |
| 2019/0132265 A1* | 5/2019 | Nowak-Przygodzki | H04L 12/1831 |
| 2019/0189117 A1* | 6/2019 | Kumar | G06F 16/3329 |

* cited by examiner

*Primary Examiner* — Marcellus J Augustin
(74) *Attorney, Agent, or Firm* — Merchant & Gould P.C.

(57) ABSTRACT

Chat-based interaction with an in-meeting virtual assistant may be provided. First, audio input associated with a meeting may be received. Next, an intent from the audio input may be detected. Text content associated with the audio input may then be generated in response to detecting the intent from the audio input. The text content may be displayed in a chat interface.

20 Claims, 5 Drawing Sheets

CHAT-BASED INTERACTION WITH AN IN-MEETING VIRTUAL ASSISTANT

RELATED APPLICATION

Under provisions of 35 U.S.C. § 119(e), Applicant claims the benefit of U.S. provisional application No. 62/874,479 filed Jul. 15, 2019, which is incorporated herein by reference.

TECHNICAL FIELD

Embodiments of the present disclosure relate generally to interactive virtual assistants, and more particularly, to enhancing meeting participation by interactive virtual assistants.

BACKGROUND

Recent technological advances have allowed meetings to be conducted more efficiently and effectively. For example, network-enabled devices have been deployed with solutions that allow people to conduct teleconferences or videoconferences with one another instead of requiring all participants to be in the same physical location. The solutions may also allow the participants to record video and/or audio during meetings, generate transcripts from meeting recordings, share notes and minutes with one another, find meeting times that work best for most or all participants, and/or interact or collaborate within a virtual or augmented environment.

However, meeting management solutions typically have limited interactivity with meeting participants. For example, an interactive virtual assistant may be used to record a meeting; generate a transcript of the meeting; and/or identify highlights, themes, sentiments, summaries, and/or insights related to the meeting. To add the interactive virtual assistant to a meeting, a user may manually dial a number that connects to the interactive virtual assistant and/or run a native, mobile, and/or web application that executes the interactive virtual assistant. Meeting attendees may then issue voice commands to the interactive virtual assistant and/or otherwise interact with the interactive virtual assistant through the phone connection and/or application. On the other hand, the meeting attendees may interact with one another via a much more immersive environment provided by a videoconferencing system, which may include an audio feed, video feed, live chat, screen sharing, and/or other communication channels and/or functionality.

As the foregoing illustrates, what is needed is a technological improvement for improving the integration and/or interactivity of interactive virtual assistants in meeting environments.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Chat-based interaction with an in-meeting virtual assistant may be provided. First, audio input associated with a meeting may be received. Next, an intent from the audio input may be detected. Text content associated with the audio input may then be generated in response to detecting the intent from the audio input. The text content may be displayed in a chat interface.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

Figure 1:
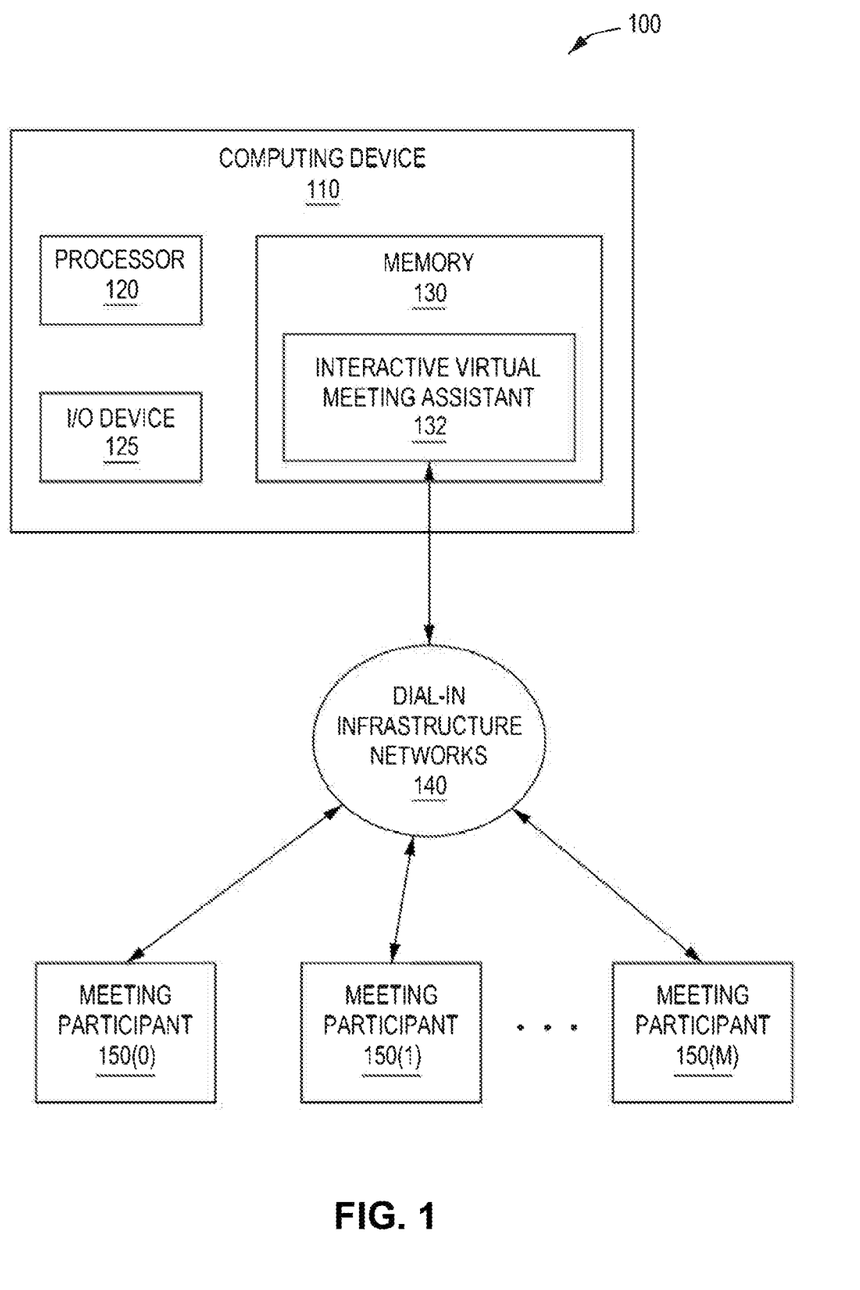
FIG. 1 is a block diagram illustrating a system configured to implement one or more aspects of the present disclosure.

FIG. 1 illustrates a system 100 configured to implement one or more aspects of the present disclosure. As shown, system 100 includes, without limitation, a computing device 110 coupled via dial-in infrastructure networks 140 to multiple meeting participants 150(0) to 150(m).

As shown, computing device 110 includes, without limitation, a processor 120, input/output (I/O) devices 125, and a memory 130. Processor 120 may be any technically feasible form of processing device configured to process data and execute program code. Processor 120 could be, for example, a central processing unit (CPU), a graphics processing unit (GPU), an application-specific integrated circuit (ASIC), a field-programmable gate array (FPGA), and so forth. I/O devices 125 may include devices configured to receive input or provide output, including, for example, a keyboard, a mouse, a display, and so forth.

Memory 130 may be any technically feasible storage medium configured to store data and software applications. Memory 130 may be, for example, a hard disk, a random-access memory (RAM) module, a read-only memory (ROM), and so forth. As also shown, memory 130 includes, without limitation, an interactive virtual meeting assistant 132, which is a software application that, when executed by processor 120, causes processor 120 to execute an interactive virtual meeting assistant application. Interactive virtual meeting assistant 132 may include any technically feasible type of virtual meeting assistant, such as the EVA application from VOICERA, INC.

Dial-in infrastructure networks 140 may be any technically feasible network or set of interconnected communication links that enable interactive virtual meeting assistant 132, as executed by processor 120, to participate in a meeting with one or more meeting participants 150(0) to 150(m). In various embodiments, dial-in infrastructure networks 140 may include, without limitation, one or more telephone line connections or one or more computer connections, such as a local area network (LAN), wide area network (WAN), the World Wide Web, or the Internet, among others. Dial-in infrastructure networks 140 may also allow interactive virtual meeting assistant 132 to access other information via the networks, such as by accessing information via the World Wide Web, or the Internet, among others.

Meeting participants 150(0) to 150(m) represent one or more human and/or computer participants in a meeting environment. Each of meeting participants 150(0) to 150(m) may be connected to other meeting participants and interactive virtual meeting assistant 132, as executed by processor 120, via any technically feasible device that forms a connection to other meeting participants, such as a telephone, smartphone, computing device, or personal data assistant, among others. The connections linking meeting participants 150(0) to 150(m) may be any technically feasible communication link(s), including, without limitation, communication links in dial-in infrastructure networks 140 and/or external communication links such as telephone line connections and/or network connections to a local area network (LAN), wide area network (WAN), the World Wide Web, or the Internet, among others.

Although FIG. 1 shows interactive virtual meeting assistant 132 stored in memory 130 of computing device 110, in alternative embodiments, interactive virtual meeting assistant 132 may be stored in part or entirely in memory 130 and/or on any technically feasible memory device internal to or external to computing device 110, including any memory device coupled to computing device 110 through a wired connection, a wireless connection, a network connection, and so forth.

Interactive virtual meeting assistant 132 includes functionality to join a meeting hosted by a teleconferencing system as a full participant. The teleconferencing system may provide features and/or services that include, but are not limited to, audio, video, chat, screen sharing, file sharing, virtual reality, webcasts, and/or webinars. For example, interactive virtual meeting assistant 132 may obtain a title, location (e.g., physical address, building number, conference room name, teleconferencing link, phone number, etc.), description, agenda, time, duration, list of participants, inviter or organizer, and/or other information describing the meeting from a calendar invitation, email, text message, chat message, voicemail, phone call, and/or other communication related to the meeting. At the start of the meeting, interactive virtual meeting assistant 132 may load a Uniform Resource Locator (URL) for the meeting in a headless browser and "sign in" to the meeting as a participant. Interactive virtual meeting assistant 132 may also install virtual input/output (I/O) devices for integrating interactive virtual meeting assistant 132 into the meeting and use the virtual I/O devices generate a visual, audio, and/or text-based representation of interactive virtual meeting assistant 132 in the meeting.

During the meeting, interactive virtual meeting assistant 132 may capture audio and/or video of the meeting; record notes or action items generated during the meeting; and/or generate a transcript and/or translation from the audio and/or video recording of the meeting. Interactive virtual meeting assistant 132 may additionally use the virtual I/O devices to detect commands issued by participants 150(0) to 150(m) and generate output in response to the commands. For example, interactive virtual meeting assistant 132 may create "highlights" and/or action items that are flagged by one or more meeting participants 150(0) to 150(m) as important; capture screenshots, images, video, and/or audio during the meeting; and/or load and/or provide links to a meeting agenda, documents, charts, visualizations, and/or other types of data associated with the meeting. As a result, interactive virtual meeting assistant 132 may provide a more interactive and/or immersive user experience for meeting participants 150(0) to 150(m) than conventional meeting management solutions and/or virtual assistants that interact with users via more limited channels (e.g., only audio).

Enhancing Meeting Attendance by Interactive Virtual Assistants

Figure 2:
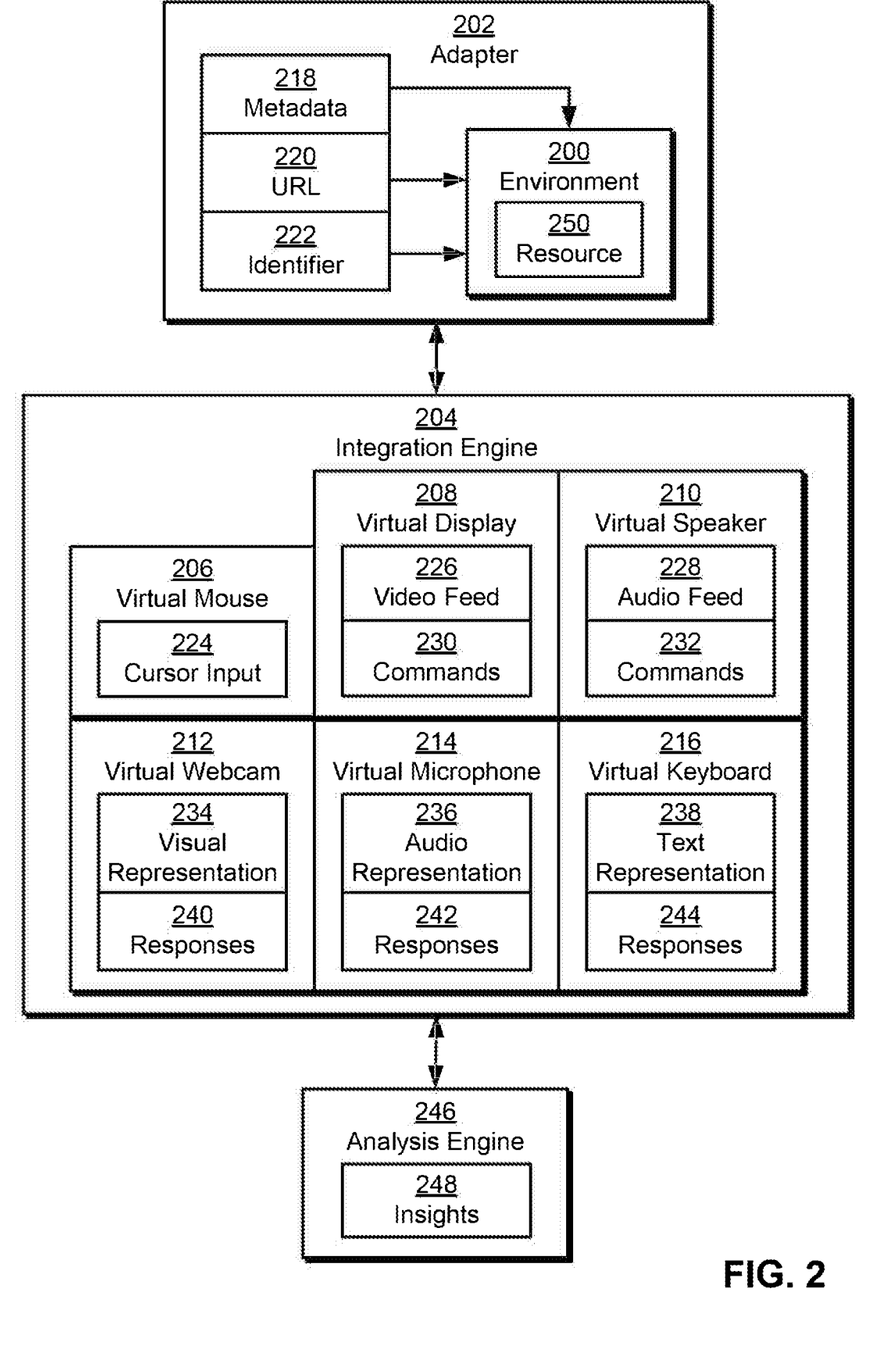
FIG. 2 is a more detailed illustration of functionality provided by the interactive virtual meeting assistant of FIG. 1, according to various embodiments of the present disclosure.

FIG. 2 is a more detailed illustration of functionality provided by interactive virtual meeting assistant 132 of FIG. 1, according to various embodiments of the present disclosure. As shown, the functionality may be provided by an adapter 202, an integration engine 204, and an analysis engine 246, which can be implemented as part of and/or separately from interactive virtual meeting assistant 132 and/or one another. Each of these components is described in further detail below.

Adapter 202 may interface with an environment 200 in which a meeting is hosted to add interactive virtual meeting assistant 132 as a participant in the meeting. For example, adapter 202 may be customized to interact with a "sign in" flow of a web application, native application, and/or other type of application for accessing a videoconferencing system on which the meeting is hosted. As a result, a different version of adapter 202 may be created for each provider of web conferencing, videoconferencing, and/or teleconferencing services into which interactive virtual meeting assistant 132 is to be fully integrated.

Integration engine 204 may provide virtual I/O devices that allow interactive virtual meeting assistant 132 to interact with other (e.g., human) participants in the meeting via communication channels supported by the provider of the web conferencing, videoconferencing, and/or teleconferencing system on which the meeting is hosted. For example, integration engine 204 may provide a virtual mouse 206 that allows interactive virtual meeting assistant 132 to generate cursor input 224 for navigating a user interface associated with the provider, a virtual display 208 that is used to receive a video feed 226 of the meeting, a virtual speaker 210 that is used to receive an audio feed 228 of the meeting, a virtual webcam 212 that generates a visual representation 234 of interactive virtual meeting assistant 132, a virtual microphone 214 that generates an audio representation 236 of interactive virtual meeting assistant 132, and a virtual keyboard 216 that generates a text representation 238 of interactive virtual meeting assistant 132.

During the meeting, analysis engine 246 may use virtual I/O devices provided by integration engine 204 to implement the functionality of interactive virtual meeting assistant 132. For example, analysis engine 246 may analyze video feed 226 and/or audio feed 228 to detect commands 230-232 issued by the other participants to interactive virtual meeting assistant 132. Analysis engine 246 may also generate responses 240-244 to commands 230-232 that are outputted over virtual webcam 212, virtual microphone 214, and/or virtual keyboard 216. In another example, analysis engine 246 may analyze video feed 226 and/or audio feed 228 to identify insights 248 related to the meeting. Analysis engine 246 may then output insights 248 during the meeting and/or store insights 248 in association with the meeting for subsequent retrieval by one or more participants in the meeting and/or other users with an interest in the meeting.

More specifically, adapter 202 may obtain metadata 218 for the meeting from a calendar invitation, email, text message, chat message, voicemail, phone call, and/or another communication or content related to scheduling or creating the meeting. As mentioned above, metadata 218 may include a date and time of the meeting, a location of the meeting (e.g., conference room, building, campus, teleconferencing ID, zip code, city, etc.), an organizer, a list of attendees, an agenda, a description, and/or other attributes related to the meeting.

Metadata 218 may additionally include information for accessing a resource 250 that is used to conduct the meeting over a teleconferencing system. For example, the meeting's location in metadata 218 may include a Uniform Resource Locator (URL) 220 for a web page that is used to access a teleconferencing and/or videoconferencing system for hosting the meeting. URL 220 may also, or instead, be provided separately from other metadata for 218 for the meeting (e.g., in a follow-up email or communication to a calendar invitation for the meeting instead of within the calendar invitation).

At the start of the meeting, an instance and/or version of adapter 202 may load resource 250 in the corresponding provider's environment 200. For example, multiple instances of adapter 202 may execute within different containers on a host to isolate resource usage by the instances from one another. Each instance may execute a version of adapter 202 that is customized to and/or compatible with the workflow for joining a meeting in a corresponding environment 200. One or more instances and/or versions of adapter 202 may use a headless browser to load a web page at a given URL 220 to access a corresponding meeting on a web-based videoconferencing system. One or more instances and/or versions of adapter 202 may also, or instead, input URL 220 and/or another representation of the meeting's location (e.g., a meeting ID for the meeting) into a native application to load one or more resources for accessing a corresponding meeting with a different videoconferencing provider (e.g., a videoconferencing system that is accessed using the native application).

Next, adapter 202 may generate input into resource 250 for adding interactive virtual meeting assistant 132 as a participant in the meeting. The input may include an identifier 222 for interactive virtual meeting assistant 132 and/or cursor input 224 that is used to navigate a workflow for joining the meeting. For example, adapter 202 may be configured to navigate one or more screens of a user interface provided by resource 250 and/or environment 200 for joining the meeting. First, adapter 202 may use virtual mouse 206 provided by integration engine 204 to generate cursor input 224 that selects a text box for entering a name of the participant. Next, adapter 202 may use virtual keyboard 216 provided by integration engine 204 to enter a name and/or other identifier 222 for interactive virtual meeting assistant 132 into the text box. Adapter 202 may then generate additional cursor input 224 for submitting identifier 222 to environment 200 and/or navigating subsequent screens in the user interface until interactive virtual meeting assistant 132 is included as a participant in the meeting.

After interactive virtual meeting assistant 132 joins the meeting via adapter 202, integration engine 204 may configure some or all of the virtual I/O devices to integrate interactive virtual meeting assistant 132 into environment 200. For example, integration engine 204 may use an application programming interface (API) with environment 200 to receive video feed 226 and/or audio feed 228 from a corresponding videoconferencing system. In another example, integration engine 204 may obtain video feed 226 and/or audio feed 228 from a graphics card, sound card, and/or other hardware and/or software resources on a host in which resource 250 is loaded. In a third example, integration engine 204 may configure virtual mouse 206, virtual webcam 212, virtual microphone 214, and/or virtual keyboard 216 to generate output that is directed to resource 250 and/or environment 200.

In one or more embodiments, output generated by integration engine 204 using virtual mouse 206, virtual webcam 212, virtual microphone 214, and/or virtual keyboard 216 includes one or more representations of interactive virtual meeting assistant 132. The representations may include a visual representation 234 that is outputted through virtual webcam 212. For example, visual representation 234 may include a logo, animation, avatar, and/or other graphic representing interactive virtual meeting assistant 132 that is displayed (e.g., in a split-screen view of participants in the meeting) to indicate that interactive virtual meeting assistant 132 is attending the meeting.

The representations may also, or instead, include an audio representation 234 that is outputted through virtual microphone 214. For example, audio representation 236 may include one or more words, phrases, and/or sentences that are outputted by a text-to-speech engine for interactive virtual meeting assistant 132 to notify other participants that interactive virtual meeting assistant 132 has joined the meeting. In another example, audio representation 236 may include a chime, jingle, tone, beep, and/or another sound indicating that interactive virtual meeting assistant 132 has joined the meeting.

The representations may also, or instead, include a text representation 238 that is generated via virtual keyboard 216 and outputted to the other participants in a chat module provided by resource 250 and/or environment 200. For example, cursor input 224 generated via virtual mouse 206 may be used to select a text box in a chat module provided by environment 200. Next, virtual keyboard 216 may be used to output, within the chat module, text representation 238 as one or more lines of chat that indicate that interactive virtual meeting assistant 132 has joined the meeting (e.g., "EVA has joined this meeting"). The outputted text representation 238 may also, or instead, include one or more lines of chat that provide hints and/or suggestions for using or interacting with interactive virtual meeting assistant 132 (e.g., a list of possible commands 230-232 and/or configuration options that can be used with interactive virtual meeting assistant 132).

Consequently, visual representation 234, audio representation 236, text representation 238, and/or other representations of interactive virtual meeting assistant 132 may be outputted within environment 200 and/or resource 250 to notify other participants in the meeting of the presence of interactive virtual meeting assistant 132 in the meeting. Such representations and/or other output generated by the virtual I/O devices may further be updated by analysis engine 246 to provide functionality and/or interactivity related to interactive virtual meeting assistant 132.

In particular, analysis engine 246 may analyze video feed 226 from virtual display 208, audio feed 228 from virtual speaker 210, data received from resource 250 (e.g., HyperText Markup Language (HTML) and/or other content from resource 250), and/or other information related to the meeting to detect commands 230-232 to interactive virtual meeting assistant 132 that are issued by participants in the meeting. In turn, analysis engine 246 may use virtual webcam 212, virtual microphone 214, virtual keyboard 216, and/or other virtual I/O devices provided by integration engine 204 to generate output that reflects responses 240-244 by interactive virtual meeting assistant 132 to the issued commands 230-232.

To interact with interactive virtual meeting assistant 132, a participant may preface a verbal command to interactive virtual meeting assistant 132 with a wake word (e.g., "OK Eva"). The participant may also, or instead, generate a text-based command by entering the wake word and command into the chat module provided by resource 250 and/or environment 200. The participant may also, or instead, use a physical gesture (e.g., a hand motion, a head motion, etc.) to activate interactive virtual meeting assistant 132 and follow the gesture with a verbal and/or text command.

Analysis engine 246 may detect the wake word and/or gesture via video feed 226, audio feed 228, and/or the chat module and update visual representation 234, audio representation 236, and/or text representation 238 to indicate that interactive virtual meeting assistant 132 has been activated by the wake word and/or gesture. For example, analysis engine 246 may change visual representation 234 of interactive virtual assistant 132 in virtual webcam 212 to provide visual confirmation of the detected wake word. In another example, analysis engine 246 may use virtual keyboard 216 to generate a text response confirming receipt of the command within the chat module (e.g., "Command received, processing . . . "). In a third example, analysis engine 246 may use virtual microphone 214 to generate a sound and/or verbal output indicating detection of the wake word, gesture, and/or command.

Next, analysis engine 246 may match a phrase following the wake word to a command supported by interactive virtual meeting assistant 132 and execute the command. For example, analysis engine 246 may generate a highlight, action item, reminder, and/or screenshot requested in the command. In another example, analysis engine 246 may obtain a copy of and/or a link to a document, image, chart, visualization, and/or other content requested in the command. In a third example, analysis engine 246 may obtain an agenda, list of participants, and/or other meeting metadata 218 requested in the command.

After the command is executed, analysis engine 246 may update visual representation 234, audio representation 236, and/or text representation 238 to indicate that the command has been executed and/or to output a result of the command. For example, analysis engine 246 may generate text, sound, and/or other output indicating that the action requested in the command was performed. In another example, analysis engine 246 may display a highlight, action item, reminder, screenshot, and/or other content or objects produced by the action. In a third example, analysis engine 246 may output a link to and/or display a document, image, chart, visualization, third-party module, and/or other content requested by the command. In a fourth example, analysis engine 246 may display and/or verbally output an agenda, list of participants, and/or other metadata 218 requested by the command. In a fifth example, analysis engine 246 may play a portion of video feed 226 and/or audio feed 228 requested by the command (e.g., the beginning of the meeting, the most recent 10 seconds of the meeting, etc.).

If a phrase following the wake word and/or gesture cannot be matched to a supported command, analysis engine 246 may generate output indicating that any actions requested by the phrase could not be performed. For example, analysis engine 246 may output an image, animation, text, and/or sound indicating an inability to execute any commands and/or perform any actions based on the content and/or sound quality of the phrase.

Analysis engine 246 may additionally generate and/or output insights 248 based on analysis of video feed 226, audio feed 228, and/or other data from resource 250 and/or environment 200. For example, analysis engine 246 may apply a speech recognition technique, face detection technique, and/or optical character recognition (OCR) technique to video feed 226 and/or audio feed 228 to generate a transcript of the meeting, produce a translation of the transcript, identify participants and/or speakers in the meeting, and/or capture text displayed in the participants' screens (e.g., during screen sharing by the participants) and/or the chat module of environment 200. Analysis engine 246 may use virtual webcam 212 to display the transcript and/or translation to providing captioning and/or translation of the discussion during the meeting. Analysis engine 246 may also annotate the transcript, translation, and/or recordings of video feed 226 and/or audio feed 228 with the corresponding speakers, arrival and departure times of participants, emotions, topics, themes, and/or other additional insights 248 related to meeting. Finally, analysis engine 246 may store the transcript, translation, metadata, and/or recordings for subsequent review and/or analysis by the participants and/or other users with an interest in the meeting.

In another example, analysis engine 246 may track the time remaining in the meeting. When the time remaining reaches a threshold (e.g., a certain number of minutes before the meeting ends) and/or when a command requesting the time remaining is detected, analysis engine 246 may update visual representation 234 with a countdown timer and/or generate an audio notification of the remaining time in the meeting.

Figure 3:
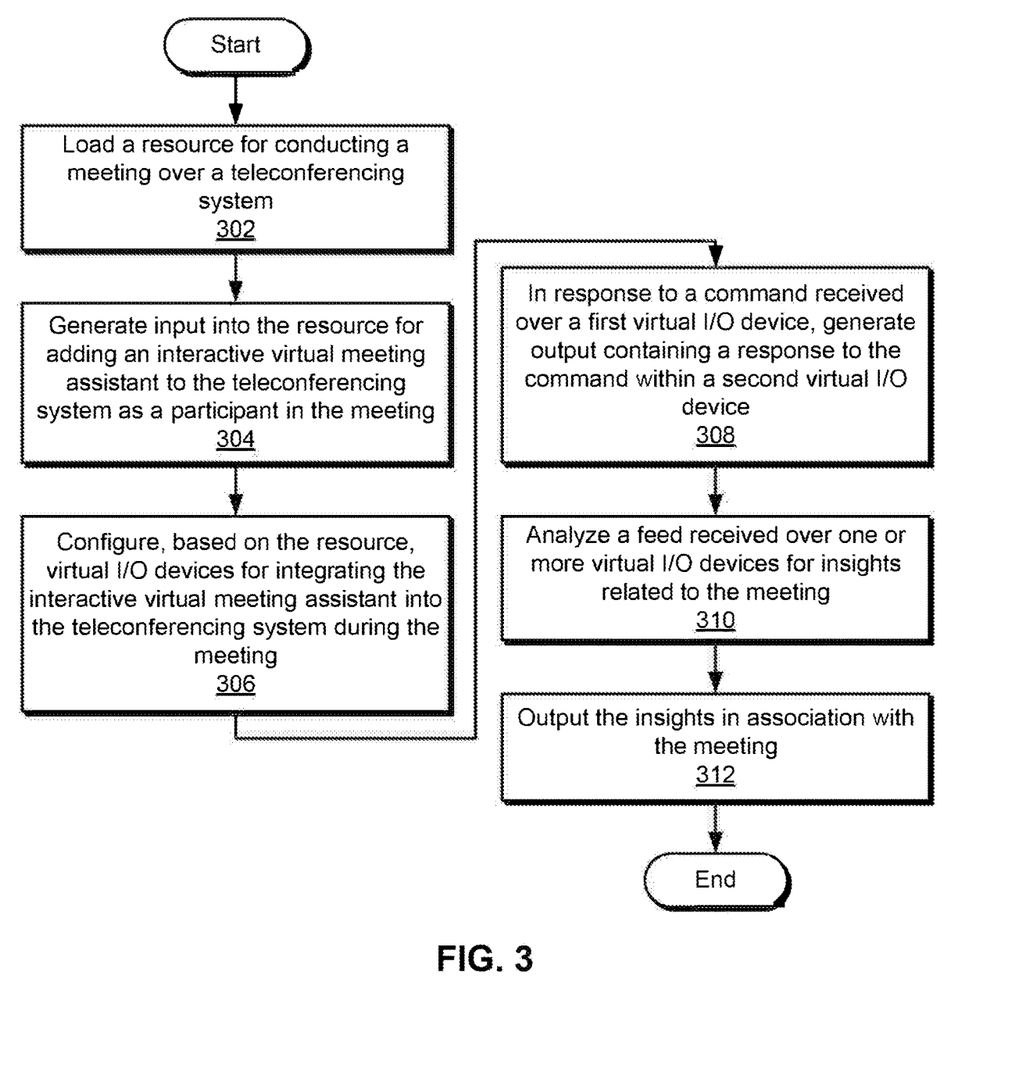
FIG. 3 is a flow diagram of method steps for enhancing meeting participation by the interactive virtual meeting assistant of FIG. 1, according to various embodiments of the present disclosure.

FIG. 3 is a flow diagram of method steps for enhancing meeting participation by interactive virtual meeting assistant 132, according to various embodiments of the present disclosure. Although the method steps are described in conjunction with the systems of FIGS. 1-2, persons skilled in the art will understand that any system configured to perform the method steps, in any order, is within the scope of the present disclosure.

As shown, adapter 202 loads 302 a resource for conducting a meeting over a teleconferencing system. For example, adapter 202 may use a URL for the meeting to load a web page for the meeting with a videoconferencing provider. Next, adapter 202 generates 304 input into the resource for adding interactive virtual meeting assistant 132 to the teleconferencing system as a participant in the meeting, as described in further detail below with respect to FIG. 4.

Integration engine 204 then configures 306, based on the resource, virtual I/O devices for integrating interactive virtual meeting assistant 132 into the teleconferencing system during the meeting. For example, integration engine 204 may use a virtual mouse to navigate a user interface of the teleconferencing system. Integration engine 204 may also, or instead use the layout and/or structure of the user interface to obtain a video feed and audio feed from the meeting, create a virtual display from the video feed, and create a virtual speaker from the audio feed. Integration engine 204 may also, or instead, output a visual representation of the interactive virtual assistant through a virtual webcam, an audio representation of the interactive virtual assistant through a virtual microphone, and/or a text representation of the interactive virtual assistant using a virtual keyboard. As a result, integration engine 204 may allow interactive virtual meeting assistant 132 to interact with other participants in the meeting via some or all communication channels supported by the teleconferencing system.

In response to a command received over a first virtual I/O device, analysis engine 246 generates 308 output containing a response to the command within a second virtual I/O device. For example, analysis engine 246 may detect and/or receive voice commands, text commands, and/or gestures from the video feed and/or audio feed; execute the commands; and/or output confirmation of the commands and/or results of executing the commands as audio responses, visual responses, and/or text responses.

Analysis engine 246 also analyzes 310 a feed received over one or more virtual I/O devices for insights related to the meeting and outputs 312 the insights in association with the meeting. For example, analysis engine 246 may apply a speech recognition technique, facial recognition technique, OCR technique, and/or another type of analysis to the video feed, audio feed, and/or other data from the teleconferencing system to produce a recording of the meeting, a transcription of the meeting, and/or a translation of the transcription. Analysis engine 246 may also, or instead, identify an attendee, speaker, emotion, and/or topic associated with the recording, transcription, and/or translation. Analysis engine 246 may also, or instead, retrieve an agenda for the meeting, a chart, a visualization, and/or a time remaining in the meeting. Analysis engine 246 may output the insights during the meeting (e.g., displaying a live transcription and/or translation of speech in the meeting) and/or store the insights for subsequent review and/or analysis by meeting participants and/or other users.

Figure 4:
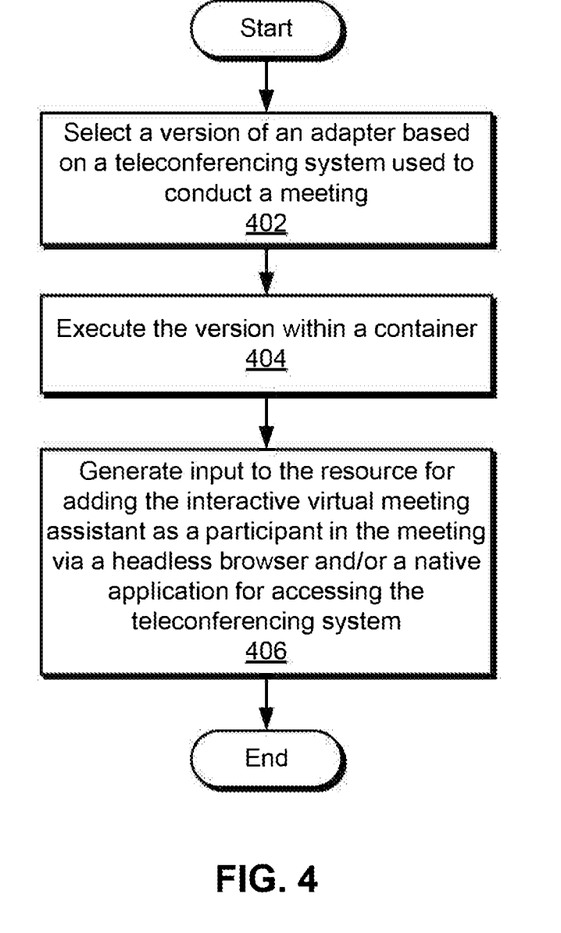
FIG. 4 is a flow diagram of method steps for executing an adapter that generates input for adding the interactive virtual meeting assistant of FIG. 1 to a teleconferencing system as a participant in a meeting, according to various embodiments of the present disclosure.

FIG. 4 is a flow diagram of method steps for executing an adapter that generates input for adding interactive virtual meeting assistant 132 to a teleconferencing system as a participant in a meeting, according to various embodiments of the present disclosure. Although the method steps are described in conjunction with the systems of FIGS. 1-2, persons skilled in the art will understand that any system configured to perform the method steps, in any order, is within the scope of the present disclosure.

As shown, integration engine 204 and/or another component selects 402 a version of adapter 202 based on a teleconferencing system used to conduct the meeting. For example, the component may use a version of adapter 202 that is customized to and/or compatible with a workflow for joining meetings in the teleconferencing system and/or an application (e.g., web application, native application, etc.) that is used to access the teleconferencing system.

Next, the component executes 404 the version within a container to isolate the version from other versions and/or instances of adapter 202 that are used to add instances of interactive virtual meeting assistant 132 to other meetings. The executed version of adapter 202 then generates 406 input to the resource for adding interactive virtual meeting assistant 132 as a participant in the meeting via a headless browser and/or a native application for accessing the teleconferencing system. For example, adapter 202 may generate cursor input to select a text box for identifying a participant in the meeting, input an identifier and/or name for interactive virtual meeting assistant 132 into the text box, submit the entered identifier and/or name, and/or generate additional cursor and/or text input required to join the meeting as interactive virtual meeting assistant 132.

Figure 5:
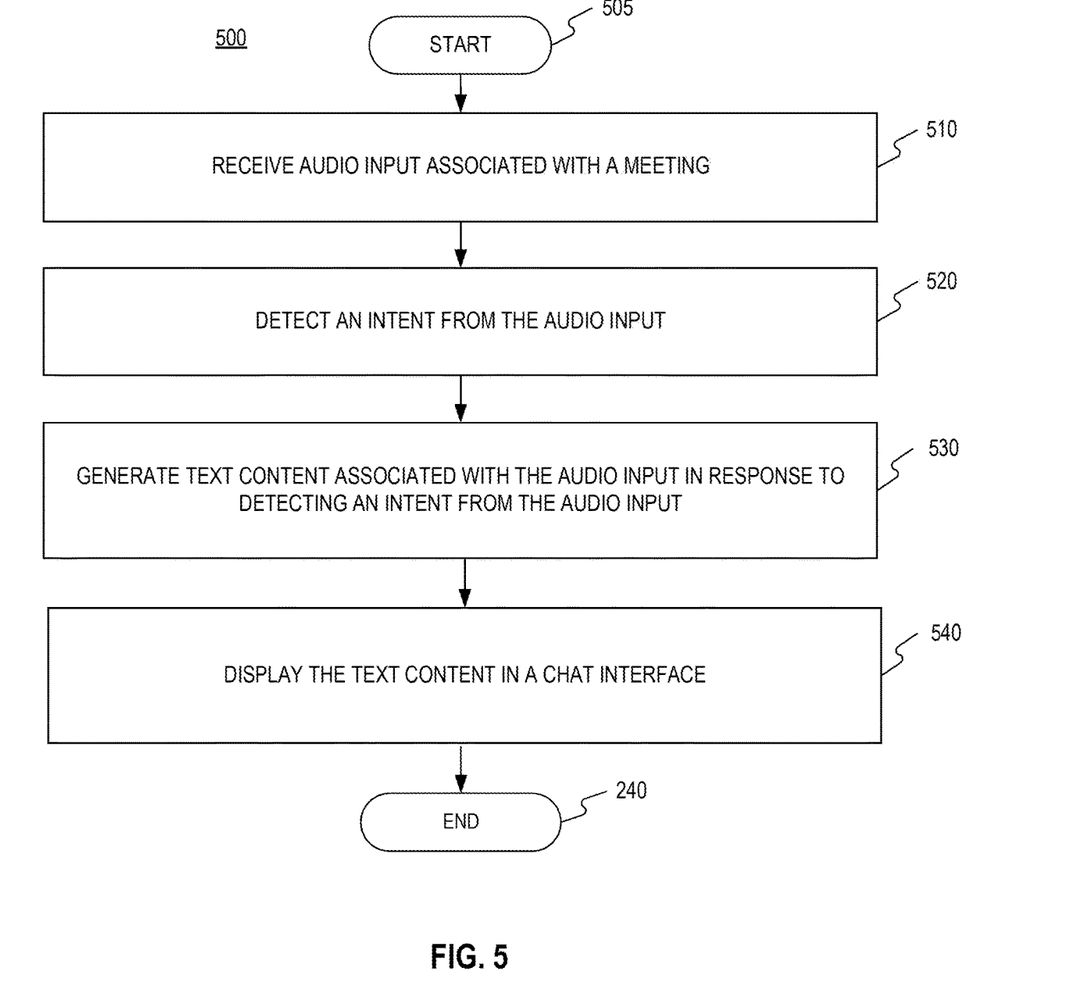
FIG. 5 is a flow diagram of method steps for chat-based interaction with an in-meeting virtual assistant by the interactive virtual meeting assistant of FIG. 1, according to various embodiments of the present disclosure.

FIG. 5 is a flow chart setting forth the general stages involved in a method 500 consistent with an embodiment of the disclosure for providing chat-based interaction with an in-meeting virtual assistant. Method 500 may be implemented by interactive virtual meeting assistant 132 using a computing device 110 as described in more detail above with respect to FIG. 1. Ways to implement the stages of method 500 will be described in greater detail below.

Embodiments of the disclosure may provide a process that may detect actions and may allow users to mark them in meetings: i) without interrupting the flow of the conversation; ii) while giving feedback to the attendees that the virtual assistant captured what was said; iii) supporting the ability to scroll back and mark an actionable intent that was said earlier; and iv) doing so with minimal, natural input from attendees so that they may focus on the conversation.

The inviter may have chat turned on, which may be the default, for the virtual assistant to start chatting. When chat is enabled, the virtual assistant may post the following announcement at the beginning: "Hi, it's the virtual assistant, your meeting assistant. First_user@example.com invited me to record and take notes. Reply with "@eva stop chat" to stop receiving chat messages." If the virtual assistant cannot post to the public channel, it may send a one-time chat message to the host asking for permission to post: "Hi, it's the virtual assistant, your meeting assistant. First_user@example.com invited me to record and take notes. Please allow attendees to chat with everyone publicly to get meeting notes tracked automatically." Embodiments of the disclosure may remember the host user ID in conference service and allow them to opt-out from chat for good by replying with "@eva stop chat". The virtual assistant may check periodically (e.g., every 10 seconds) until the end of the meeting if chat has been enabled.

In order to cease chat, the virtual assistant may cease to post messages, yet still execute commands silently, when any attendee posts "@eva stop chat" in the chat window. It may also post a confirmation message: "No more IMs. I'm still listening to commands and recording unless you ask me to leave the meeting by posting "@eva leave the meeting". Stop intent/command may understand the difference between chat and voice commands. When used in chat, it may stop the messages; when used with voice, it may still be unsupported. Repeated requests to stop receiving chat messages may prompt a user with a link (or a magic link with a token?) to change settings to turn off chat. When the meeting ends and chat is still enabled, the virtual assistant may post a summary of actions taken and a link to the meeting's page.

Method 500 may begin at starting block 505 and proceed to stage 510 where computing device 110 may receive audio input associated with a meeting. For example, a first user, an interactive digital assistant service user, may hosts a meeting with a second user who may also be an interactive digital assistant service user. The virtual assistant may post a chat message in a public channel to explain what it does and to offer an option to stop receiving chat messages: "Hi, it's the virtual assistant, your meeting assistant. First_user invited me to record and take notes. Reply with "@eva stop" to stop receiving chat messages". During the meeting, interactive virtual meeting assistant 132 may receive audio input associated with the meeting and may transcribe the receive audio input into text.

From stage 510, where computing device 110 receives the audio input associated with the meeting, method 500 may advance to stage 520 where computing device 110 may detect an intent from the audio input. For example, as the virtual assistant (e.g., interactive virtual meeting assistant 132) transcribes the meeting, it may detect an intent given in a transcript snippet (e.g., "let's create a card in Trello to present the proposal next week in LA."). Whenever the virtual assistant transcribes an utterance, for example, that does not overlap with an explicit or implicit highlight, it may attempt to detect an intent in the utterance using an intent-based recommendation system. When an intent is detected, the virtual assistant my posts the suggestion to attendees with a serial #, of which it keeps track for future references.

Once computing device 110 detects the intent from the audio input in stage 520, method 500 may continue to stage 530 where computing device 110 may generate text content associated with the audio input in response to detecting the intent from the audio input. When an intent is detected, the virtual assistant may create a suggestion to attendees with a serial #, of which it keeps track for future references. For example, in response to the aforementioned transcript snippet, the virtual assistant may create (and latter post) the following chat message: "Recommendation #1: create a card in Trello to present the proposal next week in LA—would you like me to save it?").

After computing device 110 generates text content associated with the audio input in response to detecting the intent from the audio input in stage 530, method 500 may proceed to stage 540 where computing device 110 may display the text content in a chat interface. For example, the virtual assistant may post the created chat message: "Recommendation #1: create a card in Trello to present the proposal next week in LA—would you like me to save it?"). The second user, who may have noticed the message in the public chat channel, may reply vocally with the response of "yes". The second user did not have to address the virtual assistant using "@eva", but the virtual assistant was anticipating a linear-dialog response. The virtual assistant may record the action item, may push it to the first user's integrations, and then may reply: @second_user created a task in Trello.

Whenever the virtual assistant posts a message, it may parse the next message by any attendee as a possible response. Whenever a message includes @eva/@bot/@voicea, in any case (lower/upper), the virtual assistant may parse it as a command to the intent-based recommendation system, including the stop command to cease chatting. Positive input (confirmation or an indication of a desire of a participant in the meeting to have the text content saved) may include, but is not limited to, phrases like "yes", "yep", "sure", "why not", "ok", "approved", "affirmative", "yes please", "please do", etc. An intent detection system may be used to make this determination. Negative input (confirmation or an indication of a desire of a participant in the meeting not to have the text content saved) may include phrases like "no", "nope", "don't". An intent detection system may be used to make this determination. If two or more users responded to the virtual assistant with conflicting answers, the first one may win.

Embodiments of the disclosure may include the ability to delete a highlight that was created by its serial number to allow users to correct a mistake and to allow attendees to make edits and corrections to the recommended highlight before processing it (same as issuing a new command with the corrected text). Embodiments of the disclosure may include an action called "SaveHighlight", which may post a detected actionable utterance, referred to by a serial #, to the intent-based recommendation system (e.g., can be invoked with voice as well): @(eva|bot|voicea) (save|confirm|track-|accept|submit|etc.)?(recommendation|highlight|action|item|action item|card|task|etc.)?#\d+.

The track action may be invoked via voice commander and may have no matching intent in the intent-based recommendation system. Responses for the track action may include the response for the subsumed executed command. An indicator of the referenced serial # may be included (e.g., "create a reminder tomorrow for recommendation #4—this is an open issue").

As the meeting goes on, the virtual assistant may detected many actionable intents. The first user, who may be a power user of interactive digital assistant service, may have spotted action item #3 in the chat window and may want to track it, so she may type "@evatrack #3" as a confirmation to what the virtual assistant suggested in the non-linear dialog. The virtual assistant may reply: @first_user created an action item. At the end of the meeting, the virtual assistant may posts a summary of actions taken and may drop a link (or a magiclink with a token) to the meeting's page as well. Once computing device 110 display the text content in the chat interface in stage 540, method 500 may then end at stage 550.

Embodiments of the disclosure may include adaptive subsampling. For example, actionable intents may be limited to high-value, low-noise, almost-deterministic actionable intents that attendees may want to confirm with a high engagement/confirmation rate (unless they don't want to chat with the virtual assistant). If attendees do not get engaged with the virtual assistant in chat, embodiments of the disclosure may back off a little so that the virtual assistant is not perceived as too noisy. For example, each meeting may start with a subsampling factor S=1.0, which may mean 100% of detected actionable intents are displayed. With each ignored suggestion (with no reply to the virtual assistant), embodiments of the disclosure may discount the subsampling factor such that S'=S*D, where D is close to 1.0 (e.g., 0.9) and S' can't go below a minimum (e.g., 0.2).

Since the suggested intent may be part of the audio/transcript, embodiments of the disclosure may deal with it as if the user asked the virtual assistant via a live-tap command at the time it was said. In other words, the virtual assistant may create a highlight for the actionable intent (e.g., via hotword) and it gets ensemble, it may run through the intent-based recommendation system, it may get decorated with a new source (chat), and may get its label/type based on the intent, etc.

Responses from commands for the chat platform may be shown in the chat window with a mention (that portal adds) to respond to the attendee who initiated the command: @John scheduled a follow-up meeting tomorrow at 3 p.m. The goal may be to avoid confusion when multiple commands are issued at the same time; e.g., "@eva reminder me to send the presentation after the meeting" and "@eva schedule a follow-up at 3 p.m."—humans may do the same thing in IM to avoid confusing concurrent conversation threads. If there is a supported way to mention an attendee, embodiments of the disclosure may use that; otherwise, the attendee's display name prefixed with an @ may be used as in the example above. Starting the response with the mention makes it read like the attendee is the actor: "@John created a card in Trello", which may be desirable for attribution. Chat responses may be informal, e.g., no period at the end of a sentence, sentence fragments are acceptable, etc.

In sum, the disclosed techniques may provide increased interactivity and/or functionality associated with an interactive virtual assistant across multiple meeting environments and/or teleconferencing systems. Different versions of an adapter may be used to add the interactive virtual assistant as a meeting participant to the teleconferencing systems and/or meeting environments. Virtual I/O devices may then be used to transmit audio and/or video from the meeting to the interactive virtual assistant and output representations of the interactive virtual assistant to other participants in the meeting. Interaction between the interactive virtual assistant and the other participants may be carried out by detecting commands and/or gestures in the audio and/or video and updating the representations of the interactive virtual assistant with responses to the commands and/or gestures. Transcriptions, translations, attendees, speakers, emotions, topics, themes, and/or other insights related to the meeting may additionally be obtained by analyzing the video, audio, and/or other data related to the meeting. Finally, the insights may be outputted during and/or after the meeting to further enhance the user experience with the interactive virtual assistant.

By integrating the interactive virtual assistant as a full participant in the meeting, the disclosed techniques may increase the number of communication channels available for interaction with the interactive virtual assistant during the meeting. As a result, human participants in the meeting may use the communication channels to better detect the presence of the interactive virtual assistant, provide different types of commands to the interactive virtual assistant, and/or receive different types of output from the interactive virtual assistant. Automatic execution of workflows for adding the interactive virtual assistant as a participant at the start of the meeting may further reduce overhead associated with manually executing an application for the interactive virtual assistant and/or dialing a number to reach the interactive virtual assistant during the meeting. At the same time, increased access to meeting information may improve the interactive virtual assistant's understanding of the commands, ability to support a greater number or variety of commands, and/or generation of insights from the meeting. Consequently, the disclosed techniques provide technological improvements in the interactivity, functionality, and performance of interactive virtual assistants and/or user experiences with the interactive virtual assistants.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
   receiving an audio input associated with a meeting;
   detecting an intent from the audio input;
   generating text content associated with the audio input in response to detecting the intent from the audio input; and
   displaying the text content in a chat interface;
   displaying a message seeking a response to save or discard the text content;
   discarding the text content in response to the response detected from the audio input comprising an indication of a desire of a participant in the meeting to have the text content discarded; and discounting a subsampling factor in response to the response detected from the audio input comprising the indication of the desire of the participant in the meeting to have the text content discarded.

2. The method of claim 1, further comprising receiving edits to the text content displayed in the chat interface.

3. The method of claim 1, further comprising detecting the response to the message in the audio input.

4. The method of claim 1, further comprising initiating the subsampling factor at a first predetermined level.

5. The method of claim 4, wherein the first predetermined level is a highest level for the subsampling factor for the intent.

6. The method of claim 1, wherein discounting the subsampling factor comprises discounting the subsampling factor by a predetermined amount for each indication of the desire of the participant in the meeting to have the text content discarded.

7. The method of claim 1, wherein the subsampling factor cannot be discounted below a second predetermined level.

8. An system comprising:
a memory storage; and
a processing unit coupled to the memory storage, wherein the processing unit is operative to:
  receive audio input associated with a meeting;
  detect an intent from the audio input;
  generate text content associated with the audio input in response to detecting the intent from the audio input;
  display the text content in a chat interface;
  display a message seeking a response to save or discard the text content;
  discard the text content in response to the response detected from the audio input comprising an indication of a desire of a participant in the meeting to have the text content discarded; and
  discount a subsampling factor in response to the response detected from the audio input comprising the indication of the desire of the participant in the meeting to have the text content discarded.

9. The system of claim 8, wherein the processing unit is further operative to receive edits to the text content displayed in the chat interface.

10. The system of claim 8, wherein the processing unit is further operative to:
  detect the response to the message in the audio input.

11. The system of claim 8, wherein the subsampling factor is initiated at a first predetermined level.

12. The system of claim 11, wherein the first predetermined level is a highest level for the subsampling factor for the intent.

13. The system of claim 8, wherein the processing unit being operative to discount the subsampling factor comprises the processing unit is further operative to discounting the subsampling factor by a predetermined amount for each indication of the desire of the participant in the meeting to have the text content discarded.

14. A non-transitory computer-readable medium that stores a set of instructions which when executed perform a method comprising:
  receiving audio input associated with a meeting;
  detecting an intent from the audio input;
  generating text content associated with the audio input in response to detecting the intent from the audio input;
  displaying the text content in a chat interface;
  displaying a message seeking a response to save or discard the text content;
  discarding the text content in response to the response detected from the audio input comprising an indication of a desire of a participant in the meeting to have the text content discarded; and
  discounting a subsampling factor in response to the response detected from the audio input comprising the indication of the desire of the participant in the meeting to have the text content discarded.

15. The non-transitory computer-readable medium of claim 14, further comprising receiving edits to the text content displayed in the chat interface.

16. The non-transitory computer-readable medium of claim 14, further comprising detecting the response to the message in the audio input.

17. The computer-readable medium of claim 14, further comprising initiating the subsampling factor at a first predetermined level.

18. The non-transitory computer-readable medium of claim 17, wherein the first predetermined level is a highest level for the subsampling factor for the intent.

19. The non-transitory computer-readable medium of claim 14, wherein discounting the subsampling factor comprises discounting the subsampling factor by a predetermined amount for each indication of the desire of the participant in the meeting to have the text content discarded.

20. The non-transitory computer-readable medium of claim 14, wherein the subsampling factor cannot be discounted below a second predetermined level.

* * * * *